United States Patent [19]

Mortenson

[11] Patent Number: 4,563,014
[45] Date of Patent: Jan. 7, 1986

[54] TWO-WHEELED HAND TRUCKS
[75] Inventor: Carl N. Mortenson, Midland, Mich.
[73] Assignee: Magline Inc., Bay City, Mich.
[21] Appl. No.: 494,779
[22] Filed: May 17, 1983
[51] Int. Cl.[4] .............................................. B62B 1/00
[52] U.S. Cl. ............................ 280/47.18; 280/47.27; 280/654
[58] Field of Search ................. 280/47.27, 654, 47.29, 280/47.28, 47.24, 47.18; 428/188, 116, 166, 178; 220/DIG. 12, DIG. 15; 182/228; 108/901

[56] References Cited

U.S. PATENT DOCUMENTS

| | | | |
|---|---|---|---|
| 1,114,853 | 10/1914 | Brown | 280/47.27 |
| 3,902,692 | 9/1975 | Skinner | 108/901 |
| 3,997,182 | 12/1976 | Mortenson | 280/47.27 |
| 4,121,855 | 10/1978 | Mortenson | 280/47.29 |
| 4,235,449 | 11/1980 | Tarran | 280/47.28 |
| 4,275,894 | 6/1981 | Mortenson | 280/654 |

Primary Examiner—Joseph F. Peters, Jr.
Assistant Examiner—Everett G. Diederiks, Jr.
Attorney, Agent, or Firm—Learman & McCulloch

[57] ABSTRACT

A two-wheeled hand truck structure incorporates a primary frame, adapted in use to assume a vertically inclined position and having a forwardly projecting, load supporting, nose portion. The frame comprises an open framework with side rails connected by cross rails and at its upper end has a handle portion which can be grasped by the user to propel the truck. The cross rails comprise generally U-shaped plastic bars, each having a base wall portion, spaced apart opposing wall portions extending generally parallelly therefrom, and end wall portions integrally joining the base wall portion and opposing wall portions. Internal rib sections extend integrally from each base wall portion at angles one to another at spaced intervals over the length of the cross rails and integrally join with the opposing wall portions.

20 Claims, 9 Drawing Figures

TWO-WHEELED HAND TRUCKS

BACKGROUND OF THE INVENTION

This invention relates to certain new and useful improvements in two-wheeled hand trucks of the type wherein a primary frame, adapted in use to assume a generally vertically inclined position, and having a generally forwardly disposed load-supporting nose, is supported by the wheels, and at its upper end incorporates a handle portion which can be grasped by a user to propel the truck along. The frames of such hand trucks and of open framework configuration with side rail channels in opposing disposition receiving cross brace members which are spaced apart vertically along the frame. Trucks of this type are adapted to be used in the manual transport of various products of differing configuration which may, for example, comprise heavy rectangular boxes or cartons, or heavy barrels and kegs. When the truck is in use, the load is borne both by the nose and by the vertically inclined framework, and is in engagement with and imparts stresses to the cross rails. Hand trucks for transporting curvilinear products are normally provided with curved cross rails, but frequently owners of hand trucks with linear cross rails use them to transport heavy barrels, and of course, when they do, there is a line contact of the barrel with the cross rails. Dependent, therefore, on the products being handled, the cross rails are expected to bear a considerable load which may be spread over a substantial portion of the length of the cross rail, or may be centrally applied at a relatively limited load contact location.

In the past, cross rails have usually been formed of extruded metal in a generally tubular configuration as in U.S. Pat. No. 3,997,182. U.S. Pat. No. 4,235,449 discloses a cross brace or cross rail formed of plastic material, but also in a tubular configuration. While it is important that the cross rails have sufficient rigidity and strength to function as load-bearing members in shear, it is also important that they have torsional strength and stiffness, inasmuch as torsional stresses are applied to the hand truck during use at various times, for instance, as when a load is dumped sidewise off the hand truck, or when one wheel of the hand truck is up on a curb, and the other is moving to the pavement below.

Other important considerations in the manufacture of hand trucks is lightness and economy of manufacture, so that hand trucks can be made available to all the users who have need of them.

One of the prime objects of the present invention is to provide a hand truck with a tough, reliable cross brace structure which, when formed in channel shape, can incorporate internal ribs in a particular configuration which enhances the load bearing and load distributing characteristics of the member, both in shear and in torsion, and yet is extremely lightweight in character.

Still another object of the invention is to design a hand truck of the character described wherein the cross brace structure can be provided with tubular sockets which accommodate both the vertical package support rods which are utilized in some hand trucks, and the extensible handle frame portions which also are utilized in certain hand truck designs.

Another object of the invention is to design a hand truck construction of the character mentioned wherein curvilinear cross rails can be provided which are interchangeable to function in various positions, either to present flat or curvilinear faces to the load, depending on the nature of the particular loads expected to be transported on the hand truck.

Another object of the invention is to provide a hand truck construction of the character indicated, wherein the ends of the cross rails are received within channel-shaped side rails, and the cross rails are configured to facilitate the installation of fasteners in line with the longitudinal axis of the side rail, the ends being particularly designed to accommodate either a blind rivet fastener or the nut of a bolt and nut type fastener in a manner which permits preinstallation of the nut.

SUMMARY OF THE INVENTION

A hand truck construction incorporating lightweight, one piece plastic cross rails which are channel-shaped in general configuration and have rib sections which extend angularly one to the other at inclined angles. The configuration of the connecting ribbing is such as to accommodate sockets in the cross rails for package carrier rods and for an extensible handle sub-frame. Moreover, the cross rails are reversible such as to accommodate either curvilinear or flat surfaced loads, and have end sections which are received within the side rail channel in such manner that fasteners for securing them in position may extend generally on the longitudinal axis of the cross rails, with the ends of the cross rails being so configured as to readily facilitate the securing of the cross rails in position.

Other objects and advantages of the invention will be pointed out specifically or will become apparent from the following description when it is considered in conjunction with the appended claims and the accompanying drawings.

IN THE DRAWINGS

Figure 2:
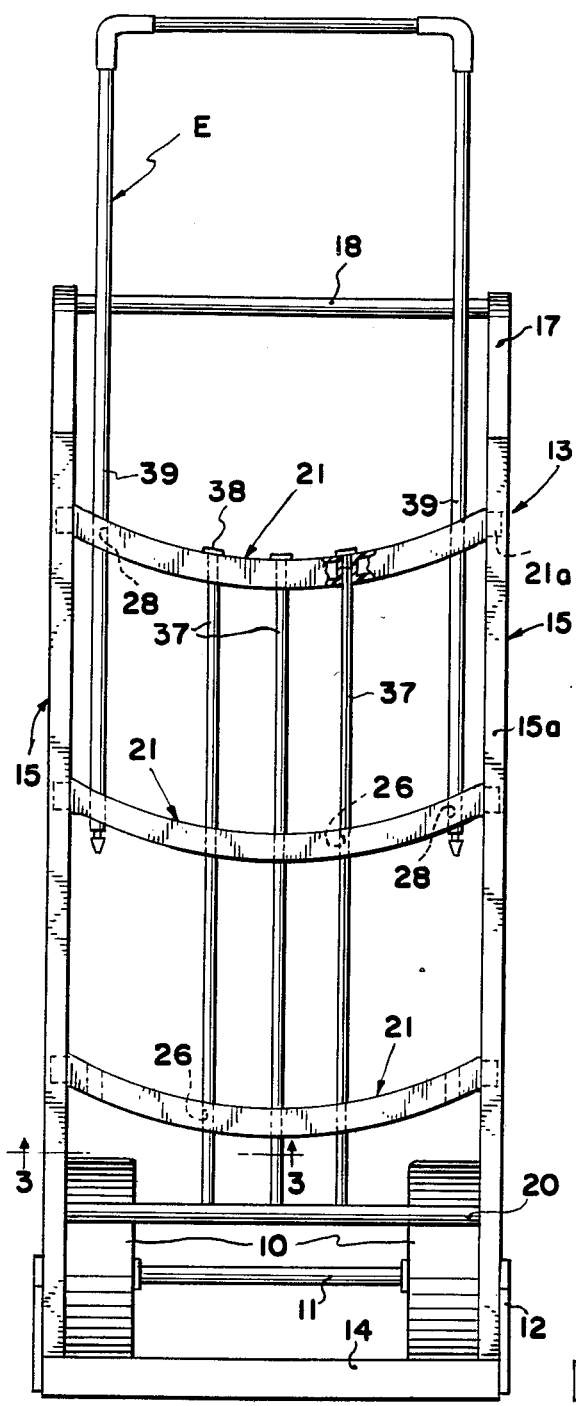
FIG. 2 is a front elevational view thereof.

Referring now more particularly to the accompanying drawings, and in the first instance to FIGS. 1-4A thereof, a hand truck, much as disclosed in U.S. Pat. No. 4,275,894 (which is incorporated herein by referenc) is disclosed, and is shown as comprising preferably rubber-tired wheels 10, mounted on an axle 11. The axle 11 as in the patent mentioned, supports side brackets 12 which secure to the lower end of a generally rectangular primary of main frame generally designated 13, in the manner disclosed, for instance, in U.S. Pat. No. 3,997,182, which also is incorporated herein by reference.

As in the patents mentioned, a load supporting nose portion or frame 14 is fixed to the lower end of frame 13, and may be supported on the frame in the manner disclosed in either of the patents. Frame 13 is disclosed as having parallel vertical side rails 15, which as presently will become apparent, are channel-shaped metal extrusions which have side walls 15a and a connecting outer web wall 15b. The outer faces of the rails 15b are generally inset as at 15c to facilitate their ready attachment to the brackets 12 via suitable fastener members 16 of the type illustrated in U.S. Pat. No. 3,997,182.

At their upper ends, side rail 15 mount handle grips 17 which may be grasped by the user to propel the hand truck forwardly, with the frame 13 in a vertically inclined position such that the weight of the product being carried is borne both by the nose 14 and by the frame 13. The handle grip portions 17 are connected by a rod 18, and it will be seen that side rails 15 are also connected near their lower ends by a cross bar 20.

Figure 1:
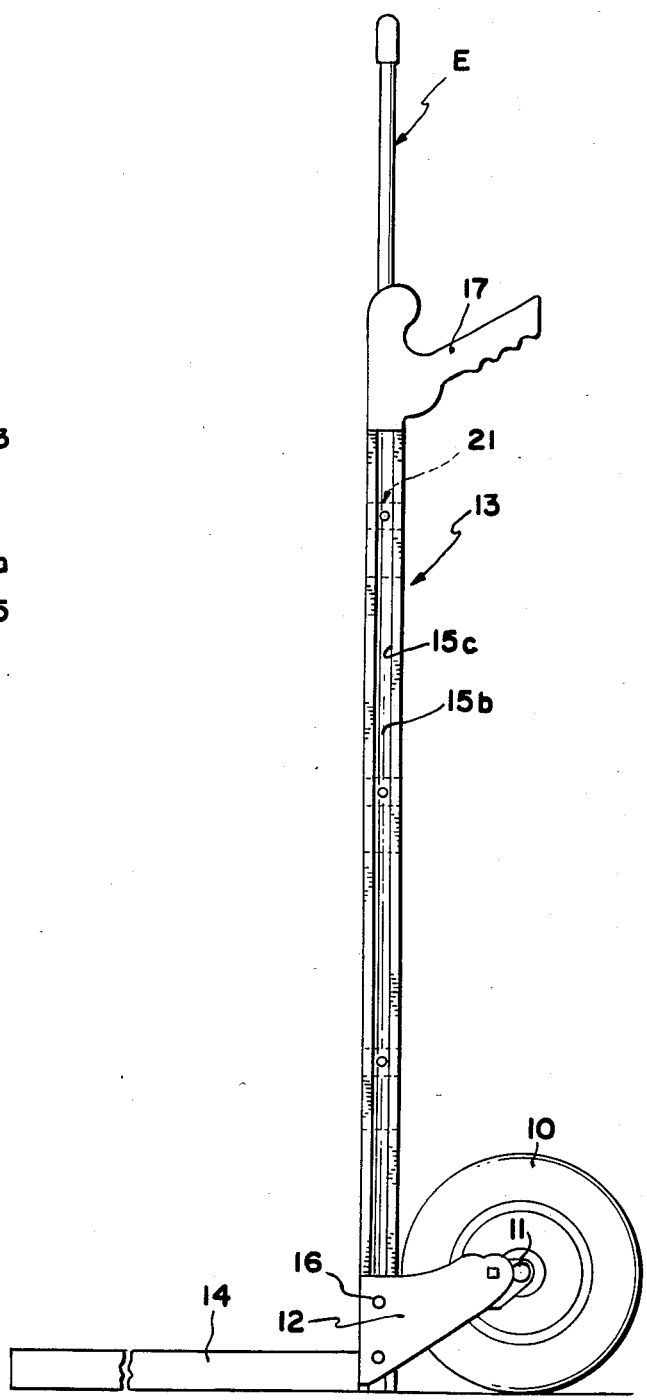
FIG. 1 is a side elevational view of a hand truck incorporating the invention.

Secured in fixed position between each of the side rails 15 are load bearing cross rails, generally designated 21. In FIGS. 1 and 2 the curvilinear cross braces 21 are turned flatwise to the load-engaging face of frame 13 and, together with side rails 15, present flatwise surfaces to the load. Each of the braces 21, which are identical, are of a one-piece character and are preferably injection molded of a suitable tough rigid plastic such as nylon, delrin or other suitable such materials. The cross rails 21 are generally channel-shaped in section and include base wall portion 22, and opposing wall portions 23 projecting perpendicularly therefrom.

As FIG. 2 particularly indicates, the end portions 21a of the cross braces 21, which are square in section, extend linearly from the curved portions of cross braces 21 at right angles to the side rails 15, and are received within the side rails 15. The end portions 21a have end wall portions 24, which are received in abutting relation with the side rail web surfaces 15b and abutment flanges 25 are provided on the cross rails as shown, to engage the inwardly facing edges of the side wall portions 15a of the side rails 15.

Figure 3:
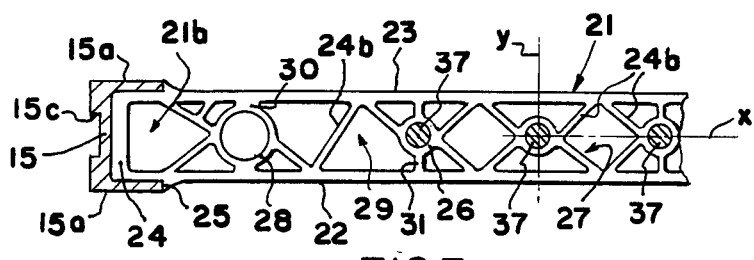
FIG. 3 is an enlarged transverse sectional view taken on the line 3—3 of FIG. 2.

As FIG. 3 particularly indicates, each cross brace 21 may be considered to have a longitudinal axis x extending centrally with respect to wall 22. A line y in FIG. 3 indicates the center of the brace 21 and, in FIG. 3, it is to be understood that the right end of the cross brace 21 on the right side of line y, is a mirror image of the cross brace on the left side of line y. A particular internal rib structure is provided which comprises rib sections 24b, which extend in angularly opposite directions at an inclined angle relative to the end wall sections 24b of the brace 21. The rib sections 24b are integrated with, and extend perpendicularly from, the base wall 22, and also are integrated with the opposed wall sections 23.

Also provided, are a plurality of open-ended sockets 26 in the central portion of cross braces 21, for a purpose which presently will be described, and it will be seen that the rib sections 24b connect the sockets 26 in diamond configuration as at 27. The sockets 26 also extend at right angles to the base wall 22. Adjacent the end portions 21a of each cross brace 21, for a purpose which, also, presently will be described, are larger diameter, open end sockets 28 and these connect to the adjacent sockets 26 by ribs 24b which are disposed in zig-zag, or Z, formation as shown at 29. Rib portions 30 are provided at the ends to connect the sockets 28 to the walls 23 over their lengths, and, similarly, rib walls 31 connect the endmost sockets 26 to the walls 23 over their length. No such wall 31 is provided at the mid socket 26, because it is desired to transmit the load applied to this mid portion over a more substantial length of the cross braces 21. At the ends of the brace rod 21, the rib portions 24b connect the sockets 28 with the walls 23 in V formation.

Figure 4:
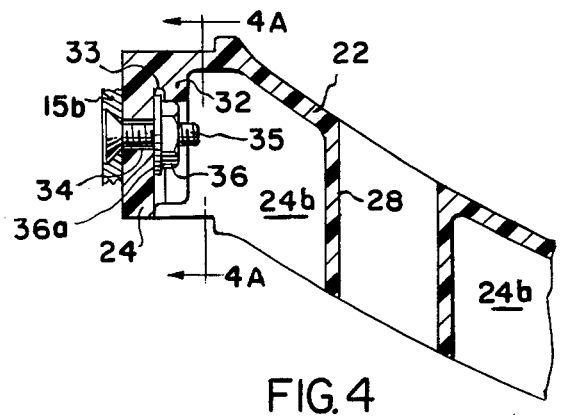
FIG. 4 is an enlarged sectional elevational view illustrating the manner in which the cross rails are secured to the side rails.
Figure 4A:
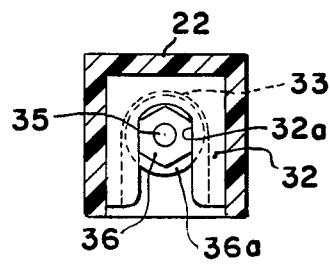
FIG. 4A is a transverse sectional view taken on the line 4A—4A of FIG. 4.
Figure 7:
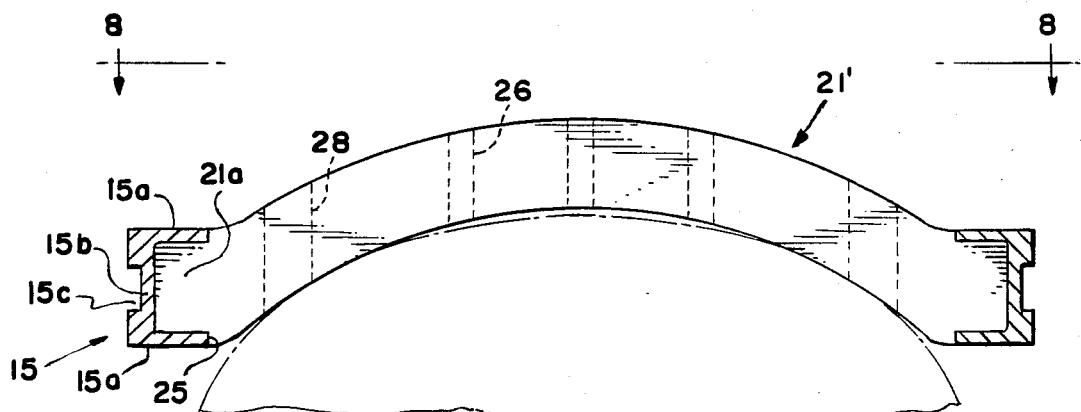
FIG. 7 is a sectional plan view, taken on the line 7—7 of FIG. 6 with the chain lines indicating a barrel in a typical position of support.
Figure 8:
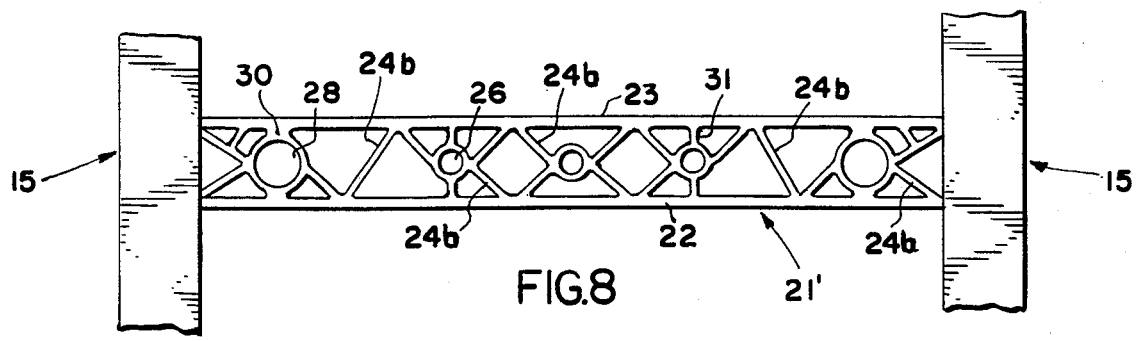
FIG. 8 is an enlarged, transverse view, taken on the line 8—8 of FIG. 7.
Figure 6:
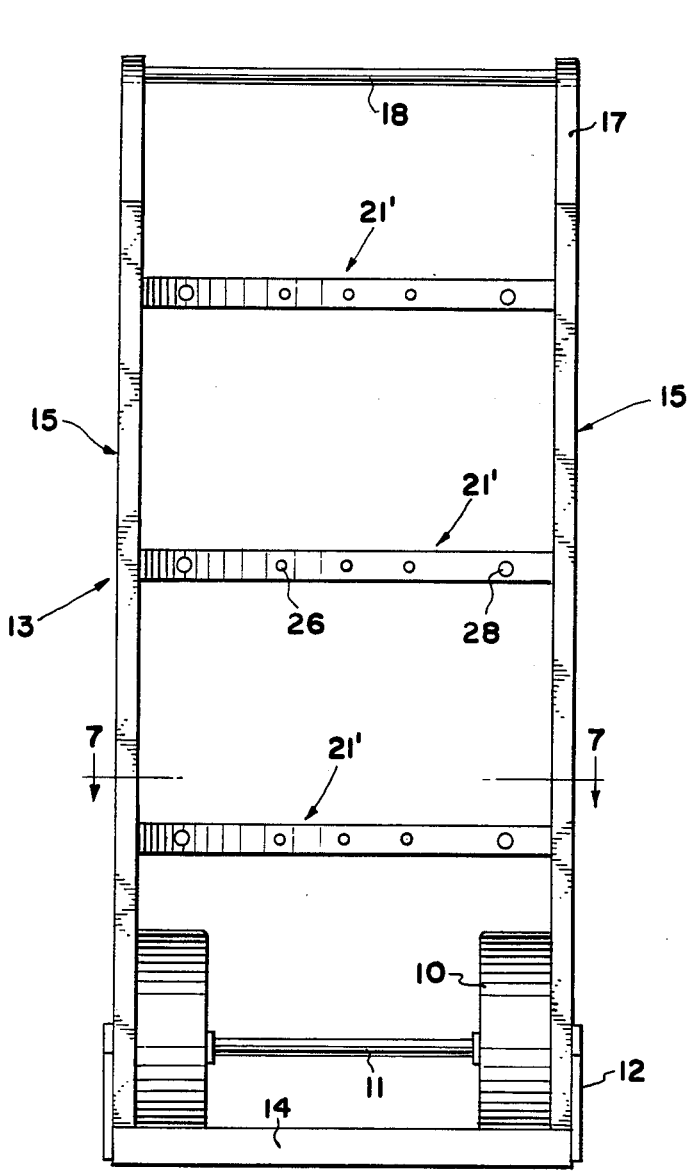
FIG. 6 is a front elevational view thereof.
Figure 5:
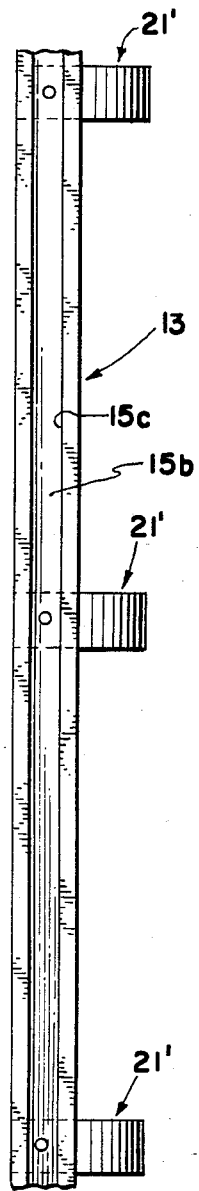
FIG. 5 is a fragmentary, sectional side elevational view of the truck, with the cross rails shown in an alternate position in which curvilinear products are to be transported.

As FIGS. 4 and 4a particularly indicate, the end walls 15b are provided with U-shaped projecting portions 32 having undercut portions 33. Openings 34 are provided to receive screws 35 which receive hex nuts 36, or the like, of the type with integral washers 36a. The washers 36a are received in the undercuts 33, and the sides of nut 36 engage the side walls of the projection 32 at 32a to prevent the nut 36 from turning. Blind rivet fasteners may also be utilized. In the construction indicated, the nut 36 can be preinserted in the undercut 33, in which it is a frictional fit, before the end 21a is inserted in rail 15, and then the screw 35 simply tightened down after the end 21a of the cross brace is inserted in the side rail 15.

As FIG. 2 indicates, light-weight package supporting tubes 37 may be inserted through sockets 26, the tubes being retained in the manner disclosed in U.S. Pat. No. 4,275,894 by plug members 38. Also, the extension frame E disclosed in U.S. Pat. No. 4,257,894 has its side rods 39 received in the enlarged side sockets 28. In FIG. 2, the telescopic frame E is shown in raised position, and it will be clear that it can be pushed downwardly, if desired, to bottom on brace 20. The manner of installing the cross braces 22 has already been described and the operation of such a hand truck is well understood. Rods 37 aid in retaining smaller packages when the packages are piled one on top of the other on top of the nose 14, and the frame 13 is tipped rearwardly, so that the weight of the packages is borne by the frame 13 as well as the nose 14. The instant rib configuration is particularly advantageous to resists and distribute torsional stresses, and to distribute the load over the length of the cross braces 21.

In FIGS. 5–8 an alternative construction is disclosed, in which the hand truck is set up particularly for carrying barrels and other products of cylindrical, or curvilinear, configuration. Like numerals have been utilized to designate like parts throughout FIGS. 5–8, and it will be seen that the construction is virtually identical. Here the brace rods 21' are, however, turned so that their curvilinear configuration faces forwardly (see FIG. 7). In this configuration, the base wall 22 of the ribs 21 is the load engaging wall and the telescoping extension frame E and package supporting rods 37 are, of course, not employed. The ribbing structure is, however, utilized in the same manner to provide the necessary resistance to twisting moments and achieve a favorable load distribution.

While two embodiments of the invention have been described in detail, it will be apparent to those skilled in the art that the disclosed embodiments may be modified. Therefore, the foregoing description is to be considered exemplary, rather than limiting, and the true scope of the invention is that defined in the following claims.

I claim:

1. In a two-wheeled hand truck structure incorporating a pair of wheels; a primary frame, adapted in use to assume a vertically inclined position and having a forwardly projecting, load supporting, nose portion, supported on said wheels; the frame comprising an open framework with side rails connected by cross rails and at its upper end having a handle portion which can be grasped by the user to propel the truck; the improvement wherein: at least one of the cross rails comprises a generally U-shaped plastic bar having a base wall portion, spaced apart opposing side wall portions extending generally parallelly therefrom, and end wall portions integrally joining the base wall portion and opposing side wall portions; fastener means securing the ends of said one cross rail to said side rails; bar reinforcing tubular socket portions, spaced inwardly from said side rails and fasteners, and dispersed in spaced relation along said cross rail, having side walls projecting within said bar axially perpendicularly to said base wall portion along axes parallel to said opposing side wall portions of the bar; and rib sections extending integrally from said base wall portion at angles one to another, at least some of the rib sections being inclined with respect to said end wall portions at spaced intervals over the length of the cross rail and integrally also joined with the said opposing side wall portions and said socket side walls.

2. The invention defined in claim 1 in which said cross rails are curvilinear with linearly extending end portions, the end wall portions of the cross rails function as the outer ends of said end portions to abut said side rails, and means are provided to secure said side rails to said end wall portions.

3. The invention defined in claim 2 in which said side rails are U-shaped to receive said end wall portions and disposed in opposing disposition.

4. The invention defined in claim 1 wherein said side rails comprise channel-shaped members in opposed disposition with side walls facing inwardly, and the ends of said cross rails are received therein; the cross rails having projecting abutments thereon at a spaced distance inwardly from said end wall portions engaged in abutting relation with the ends of the side walls of the channel-shaped side rails; and fastener members extending between said side rails and cross braces to secure the cross rails in position with the abutments secured against the ends of the side walls of the side rails.

5. The invention defined in claim 4 wherein the side rails have web portions joining the side walls thereof and the end wall portions of the cross rails are located in abutting relation therewith by said abutments.

6. The invention defined in claim 1 wherein said sockets open through said base wall and are open at their opposite ends also; and certain of said rib sections are integrally joined in diamond formation between and to said socket walls.

7. The invention defined in claim 6 wherein a plurality of said cross rails are connected between said side rails and intermediate brace rods extend vertically through said socket walls and are retained in position therein.

8. The invention defined in claim 1 wherein certain of said rib sections are integrally joined in zig-zag formation.

9. The invention defined in claim 1 wherein said sockets open through said base wall and are open at their opposite ends also, and certain of said rib sections are joined in V formation to said socket side walls along their projecting lengths.

10. The invention defined in claim 9 wherein said socket side walls comprise first socket walls extending perpendicularly from the base wall portion of said cross rail in spaced apart relation in the central portion of said cross rail, and larger diameter second socket walls extending perpendicularly from the base wall portion of the cross rail near the ends of said cross rail, rib sections joining said first socket walls being disposed in diamond formation and rib sections between said second socket walls and the adjacent first socket walls being in Z formation.

11. The invention defined in claim 1 wherein ribs extending generally perpendicularly to said opposing side wall portions of the cross rail and extending integrally from the base wall portion integrally join certain of the first and second socket walls with the said opposing side wall portions of the cross rail.

12. In a two-wheeled hand truck structure incorporating a pair of wheels; a primary frame, adapted in use to assume a vertically inclined position and having a forwardly projecting, load supporting, nose portion, supported on said wheels; the frame comprising an open framework with side rails connected by cross rails and at its upper end having a handle portion which can be grasped by the user to propel the truck; the improvement wherein: at least one of the cross rails comprises a generally U-shaped plastic bar having a base wall portion, spaced apart opposing side wall portions extending generally parallelly therefrom, and end wall portions integrally joining the base wall portion and opposing side wall portions; said side rails comprising opposing channels with web sections disposed outwardly such that said cross rail ends are received within said channels with the said end wall portions in abutting relation with the inner faces of said web sections; said end wall portions having portions projecting inwardly, and at a spaced distance from said end wall portions having overhanging flange portions providing an undercut; and fastener members extending through said web portions of the side rails and end wall portions of the cross braces and having washer elements received within said undercuts trapped by said flange portions.

13. The invention defined in claim 12 wherein said flanges are U-shaped and nuts on said fasteners are trapped between said flanges and prevented from rotating thereby.

14. In a two-wheeled hand truck structure incorporating a pair of wheels; a primary frame, adapted in use to assume a vertically inclined position and having a forwardly projecting, load supporting, nose portion, supported on said wheels; the frame comprising an open framework extruded metal side rails connected by cross rails and at its upper end having a handle portion which can be grasped by the user to propel the truck; the improvement wherein: at least one of the cross rails comprises a longitudinally curvilinear plastic bar with linearly extending end sections of square cross section; the rails having front and rear side walls and being recessed to snugly receive said end sections between said front and rear side walls whether the cross rail is disposed to present a rearwardly projecting, curvilinear surface to a curvilinear load or disposed in a position rotated 90 degrees thereto to present a flat surface to a flat surfaced load; and means for releasably securing said end sections to said rails.

15. The invention defined in claim 14 in which said cross rails have end wall portions to abut said side rails, and said securing means comprises longitudinally extending fastener means extending through said side rails and end wall portions to secure said side rails to said end wall portions.

16. The invention defined in claim 15 in which said side rails are U-shaped to receive said end wall portions and disposed in opposing disposition, and said cross rails are channel-shaped in section.

17. The invention defined in claim 14 in which said one cross rail comprises a generally U-shaped plastic bar having a base wall portion, spaced apart opposing side wall portions extending generally parallelly therefrom, and end wall portions integrally joining the base wall portion and opposing side wall portions; and rib sections extending integrally from said base wall portion at angles one to another, at least some of the rib sections being inclined with respect to said end wall portions at spaced intervals over the length of the cross rails and integrally also joined with the said opposing side wall portions.

18. The invention defined in claim 14 in which said one cross rail comprises a generally U-shaped plastic bar having a base wall portion, spaced apart opposing side wall portions extending generally parallelly therefrom, and end wall portions integrally joining the base wall portion and opposing side wall portions; tubular socket portions having side walls projecting axially perpendicularly to said base wall portion along axes parallel to said opposing side wall portions of the bar within said bar; and rib sections extending integrally from said base wall portion at angles one to another, at least some of the rib sections being inclined with respect to said end wall portions at spaced intervals over the length of the cross rails and integrally also joined with the said opposing side wall portions and said socket side walls.

19. In a two-wheeled hand truck structure incorporating a pair of wheels; a primary frame, adapted in use to assume a vertically inclined position and having a forwardly projecting, load supporting, nose portion, supported on said wheels; the frame comprising an open framework with side rails connected by cross rails and at its upper end having a handle portion which can be grasped by the user to propel the truck; the improvement wherein: at least one of the cross rails comprises a longitudinally extending plastic bar having spaced apart opposing wall portions, and end wall portions integrally joining opposing wall portions; the end wall portions incorporating trap means for fastener means which extend longitudinally to secure the side rails to said end wall portions; said side rails comprising opposing channels with web sections disposed outwardly such that said cross rail ends are received within said channels with the said end wall portions in abutting relation with the inner faces of said web sections; said end wall portions having portions projecting inwardly to provide flanges; and nuts on said fasteners are trapped between said flanges and prevented from rotating thereby.

20. The invention defined in claim 19 in which said flanges are spaced from said end wall portions to provide an undercut in which washers integral with the nuts are received.

* * * * *